United States Patent [19]
Wier et al.

[11] Patent Number: 5,954,365
[45] Date of Patent: Sep. 21, 1999

[54] VEHICULAR SEAT BELT

[75] Inventors: Franz Wier; Michael Wier, both of Göggingen, Germany

[73] Assignee: TRW Occupant Restraint Systems GmbH, Alfdorf, Germany

[21] Appl. No.: 09/021,875

[22] Filed: Feb. 11, 1998

[30]  Foreign Application Priority Data

Feb. 25, 1997 [DE] Germany .................. 297 03 358 U

[51] Int. Cl.⁶ .......................... B60R 22/00; B60R 22/28
[52] U.S. Cl. ................................ 280/801.1; 280/805
[58] Field of Search ..................... 280/801.1, 801.2, 280/805; 297/468, 470, 471, 472, 482; 24/265 AL, 265 CD, 570, 571; 188/374

[56]  References Cited

U.S. PATENT DOCUMENTS 4,606,441  8/1986  Markov .................. 280/805
5,050,906  9/1991  Kneip ..................... 280/805

Primary Examiner—Lanna Mai
Assistant Examiner—Jeff Restifo
Attorney, Agent, or Firm—Tarolli, Sundheim, Covell Tummino & Szabo

[57]  ABSTRACT

A vehicular seat belt has an anchorage fitting fastened to a belt webbing. To simplify production of the vehicular seat belt and to save belt webbing, said anchorage fitting comprises two clamping surface areas opposing each other, between which said belt webbing is clamped.

18 Claims, 7 Drawing Sheets

VEHICULAR SEAT BELT

The invention relates to a vehicular seat belt having an anchorage fitting fastened to a belt webbing.

BACKGROUND OF THE INVENTION

Known vehicular seat belts comprise an anchorage fitting including a fastening hole for fastening the fitting to the vehicle body and an eye for fastening the belt webbing. For fastening the belt webbing it is inserted through the eye, wrapped around the latter and stitched into a loop. To make the loop and the seams sufficiently resistant to tensile stress, a considerable length of belt webbing is needed. Looping the belt webbing into the eye and subsequently stitching the belt webbing to the loop are cost-intensive operations.

SUMMARY OF THE INVENTION

The invention simplifies production of the vehicular seat belt and saves belt webbing. Fastening the belt webbing to the anchorage fitting is facilitated, resulting in cost-intensive operations being eliminated.

In accordance with the invention it is provided for that the anchorage fitting comprises two clamping surface areas opposite each other, between which the belt webbing is clamped in place. Retaining the belt webbing between two clamping surface areas permits reliable attachment of the belt webbing to the anchorage fitting without the belt webbing needing to be stitched. By means of surface area clamping the belt webbing is consistently retained so that on tensile loading of the belt webbing no localized peak material loads occur therein. By suitably configuring the clamping surface areas the clamping length can thus be maintained short and belt webbing can be saved as compared to a stitched loop fastening.

The anchorage fitting is advantageously configured as a tubular component which is pressed to a flat shape. This flattened tubular component accommodates the belt webbing, as a result of which the anchorage fitting is simply achieved by a single component only. Depending on requirements and the space available for fitting, the belt webbing may be introduced into the tube in full width or creased about its longitudinal direction prior to it being flattened. After having pressed the tube to a flat shape the side sections, as springy elements, of the flattened tube maintain the pretension on the belt webbing.

It is likewise of advantage to configure the anchorage fitting from a creased strip of sheet metal which surrounds the belt webbing similar to the arrangement of the flattened tube. For this purpose the side sections of the strip of sheet metal are creased longitudinally to receive the belt webbing. To prevent the creased side sections shifting out of place with respect to each other under tensile stress the creased side sections feature a complementary corrugated abutment edge.

In accordance with another embodiment of the invention the anchorage fitting comprises two sandwiched strips of sheet metal having side retaining noses which between them receive the belt webbing. The retaining noses are retained in a side carrier part and caulked to connect the strips of sheet metal to each other, to pretension them relative to the belt webbing and to lock them in the carrier part. In addition to simplifying mounting of the anchorage fitting the production of the latter is facilitated since simple sheet-metal parts can be used without necessitating any additional reshaping operations.

In a further aspect of the invention the clamping surfaces areas are formed complementary corrugated to each other. By corrugating the clamping surface areas they are, on the one hand, rendered larger as compared to a plain configuration for the same overall length of the anchorage fitting and, on the other, the resulting deflections in the belt webbing contribute towards reliable mounting of the belt webbing in the anchorage fitting safe from being pulled out.

In accordance with a further aspect of the invention the corrugation height increases towards the anchoring on the vehicle body in the longitudinal direction of the belt webbing. The force translatable of each respective corrugation from the belt webbing to the anchorage fitting thus increases towards the anchorage on the vehicle body, as a result of which an additional safety margin is assured against the belt webbing being pulled out of place.

By forming said anchorage fitting at least partly corrugated and said anchorage fitting being deformable by a force acting in the longitudinal direction of the belt webbing, which is determined by a predetermined belt force limit diagramm, by stretching said corrugated parts, the force occurring in the belt webbing can be limited. Advantageously, said determined force amounts to between 2500N and 6000N.

In accordance with another aspect of the invention hemispherical impressions and complementary protuberances are provided in the clamping surface areas to render the clamping surface areas larger and to reliably retain the belt webbing in the anchorage fitting.

Preferably the clamping surface areas are provided with grooves running transversely to the longitudinal direction of the belt webbing. Due to the higher frictional resistance as compared to a smooth finish of the clamping surfaces areas in such an arrangement the overall clamping surface area may also be reduced for the same loading capacity which is conducive to a more compact design of the anchorage fitting. If the anchorage fitting is configured tubular the transverse grooves may be simply provided as a female thread prior to the tube being flattened.

For reliably retaining the belt webbing in the anchorage fitting a rubber surface finish may also be employed. Here too, the clamping surface area and thus the overall size of the anchorage fitting can be reduced as compared to a version having no rubber surface finish for the same loading capacity. The frictional resistance between belt webbing and clamping surface area can be further enhanced by also providing the belt webbing with a rubber surface finish.

In accordance with an advantageous aspect of the invention the clamping surface areas are connected to each other by rivets. Due to rivets the clamping surfaces areas may be pretensioned relative to the belt webbing, and a consistent clamping force on the belt webbing over the full clamping length thereof may be achieved. So as not to injure the belt webbing fabric when inserting the rivet, it instead being pushed aside, the rivets feature in the non-riveted condition a tapered front part. In this arrangement the rivets can be disposed to the side or in the middle of the clamping surface areas, depending on the distribution of the clamping force desired.

For connecting the clamping surface areas a bolt fastener together with a spring washer may also be employed. By making use of the spring washer the pretensioning force produced by the bolt fastener can be consistently transmitted to the clamping surfaces areas and thus to the belt webbing. In this arrangement the bolt fastener may be configured also as a connection of the anchorage fitting to the vehicle body.

In another example embodiment of the invention it is provided for that the clamping surface areas are creased in the transverse direction of the belt webbing, making possible a good translation of the tensile force acting on the belt webbing to the clamping surfaces areas and thus to the anchorage fitting in a loading situation. The creased clamping surface areas may be clasped by a clip fastener, serving to increase the pretensioning of the clamping surface areas relative to the belt webbing and to transfer the force over a large surface area to the clip fastener.

It is of advantage when the wall thickness of the anchorage fitting increases transversely to the longitudinal direction of the belt webbing from the belt webbing outer edges to the middle thereof. A higher wall thickness in the middle of the anchorage fitting is conducive to a more consistent distribution of the clamping force on the belt webbing due to the higher stiffness. Even when the clamping surface areas are connected to each other merely on the side of the belt webbing the anchorage fitting bends only slightly, and the clamping force can also be still be maintained in the middle.

It is also of advantage to configure the clamping surface areas convex transversely to the longitudinal direction of the belt webbing. In this way the belt webbing is reliably clamped in the middle without bending of the anchorage fitting, which occurs on holding the clamping surface areas together at the sides, having a negative effect.

Yet a further embodiment of the invention is characterized by the clamping surface areas having depressions and complementary protuberances oriented in the longitudinal direction of the belt webbing which reliably retain the belt webbing in the anchorage fitting even when heavily loaded.

To stiffen the anchorage fitting over the width of the belt webbing the end sections of the anchorage fitting are advantageously bent away from the belt webbing, this permitting by simple means the anchorage fitting to be stiffened in its end portion which is conducive to a consistent distribution of the clamping force and thus reliable retainment of the belt webbing.

BRIEF DESCRIPTION OF THE DRAWINGS

Preferred example embodiments of the invention are described in the following and illustrated in the drawing in which.

DESCRIPTION OF THE PREFERRED EMBODIMENTS

Figure 1:
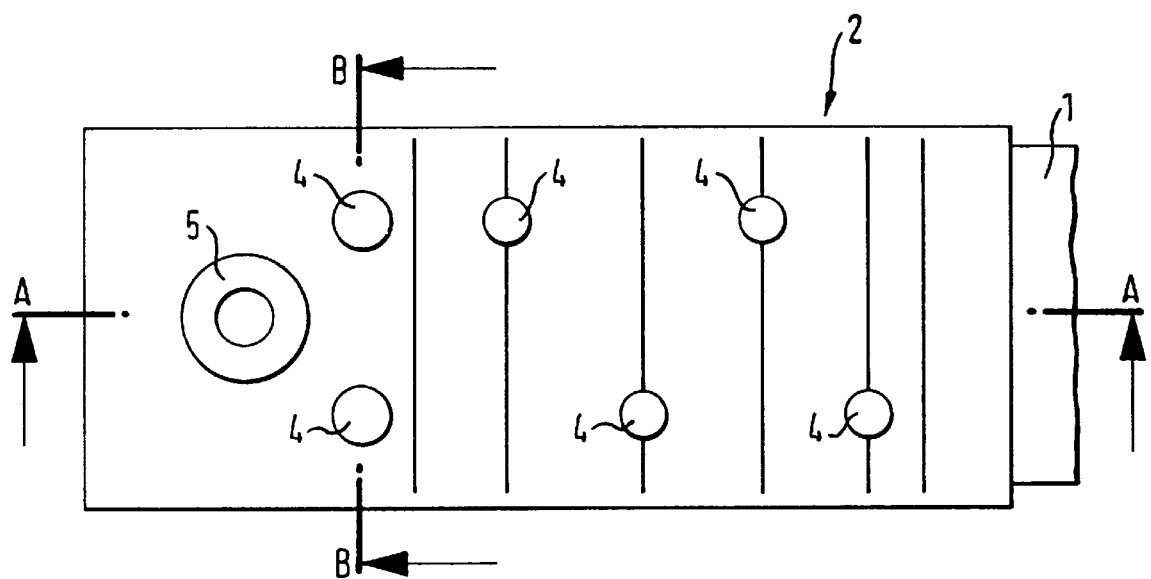
FIG. 1 is a plan view of the anchorage fitting of a first embodiment of the invention.

A vehicular seat belt comprises, as shown in FIG. 1, an anchorage fitting 2 fastened to the belt webbing 1, this anchorage fitting being provided in its rear section facing away from the belt webbing with a pull-through 5 to fasten the anchorage fitting 2 by means of a bolt fastener (not shown) to a vehicle body (likewise not shown). The anchorage fitting 2 is configured as a tube, which is pressed to a flat shape, into which the belt webbing 1 is introduced prior to flattening and which subsequently is shaped by a pressing tool into the configuration shown in FIGS. 1, 2 and 3. This change in shape of the tube results in the belt webbing 1 being firmly clamped in place in the anchorage fitting 2. To further promote this clamping effect rivets 4 are provided which extend transversely to the belt webbing through the anchorage fitting 2.

Figure 2:
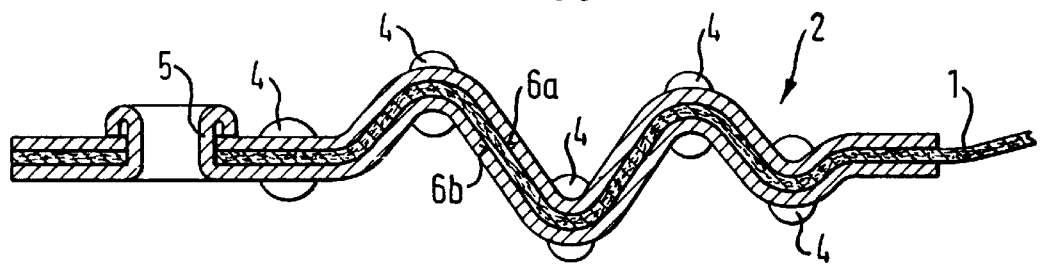
FIG. 2 is a section view of the anchorage fitting shown in FIG. 1 along the line A—A.

In the section view shown in FIG. 2 along the line A—A of FIG. 1 the clamping surface areas 6a, 6b of the anchorage fitting 2 are evident, between which the belt webbing 1 is held. The anchorage fitting 2 is shaped corrugated to make the force necessary for pulling out the belt webbing 1 from the anchorage fitting 2 greater as compared to that required for a plain version. In this arrangement the height of the corrugation increases towards the anchoring to the vehicle body in the longitudinal direction of the belt web. The anchorage fitting 2 will be deformed by stretching the corrugations, if a force acting on the belt webbing 1 exceeds a value, which is determined by a predetermined belt force limit diagramm. As a result, the force occurring in the belt webbing 1 can be limited. The pull-through 5 for the bolt fastener of the anchorage fitting 2 at the anchoring is rimmed in its section located on the upper surface of the anchorage fitting 2 to force the clamping surfaces areas 6a, 6b in the region of the pull-through 5 against the belt webbing 1 and thus to ensure the reliable hold of the latter in the anchorage fitting 2.

Figure 3:
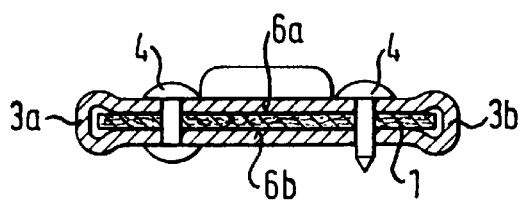
FIG. 3 is a section view of the anchorage fitting shown in FIG. 1 along the line B—B, FIG. 4. is a plan view of the anchorage fitting of a second embodiment of the invention.

In the section view of the anchorage fitting shown in FIG. 3 along the line B—B of FIG. 1 the rivets 4 are illustrated which connect the clamping surface areas 6a, 6b to each other and pretension them against the belt webbing 1, as a result of which the clamping forces acting between the clamping surface areas 6a, 6b and the belt webbing 1 are increased and distributed evenly over the clamping surface areas. In applying the rivets 4 to the anchorage fitting 2 care is to be taken not to damage the fabric of the belt webbing 1 when inserting the rivets 4. For this purpose the rivets 4 are configured tapered at their front portion so that the threads of the belt webbing fabric are urged to the side on insertion of the rivets 4. The side sections 3a, 3b of the flattened tube result in a springy connection between the clamping surface areas 6a, 6b and maintain the clamping forces on the belt webbing 1 even after flattening.

Figure 4:
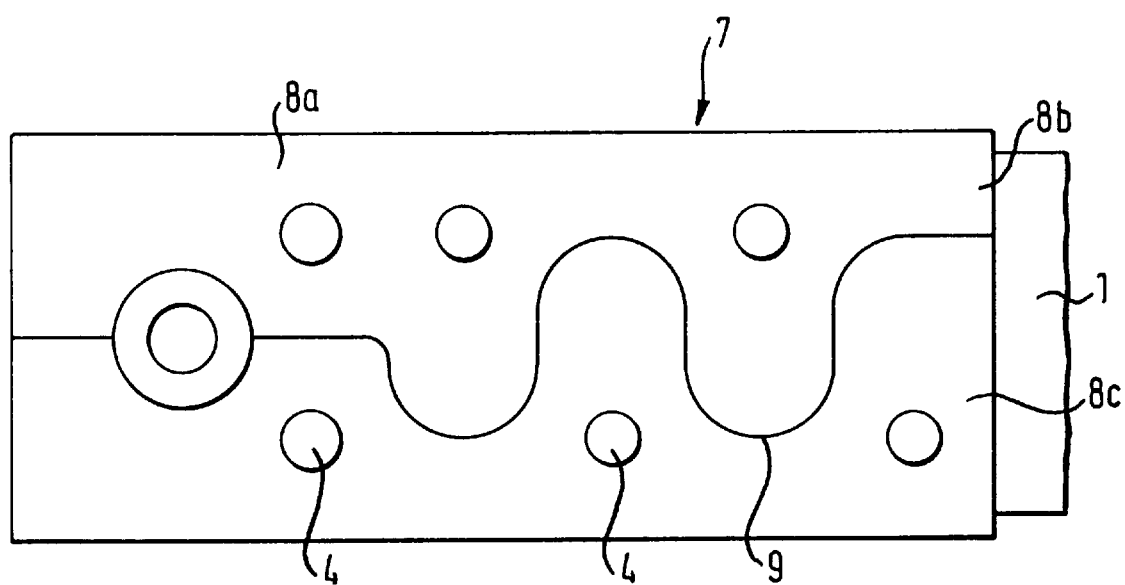

FIG. 4 shows an anchorage fitting 7 of a second embodiment in accordance with the invention. In this case the anchorage fitting 7 consists of a single strip of sheet metal 8a, the side sections 8b, 8c of which are creased to receive the belt webbing 1 similar to a flattened tube. To mainly prevent displacement of the creased side sections 8b, 8c with respect to each other and relative to the section of the strip of sheet metal 8a located on the other side of the belt webbing 1, when the belt webbing 1 is subjected to tensile stress, the side sections 8b, 8c are provided with a complementary corrugated abutment edge, along which they interengage at least partly under tensile stress of the belt webbing 1.

Figure 5:
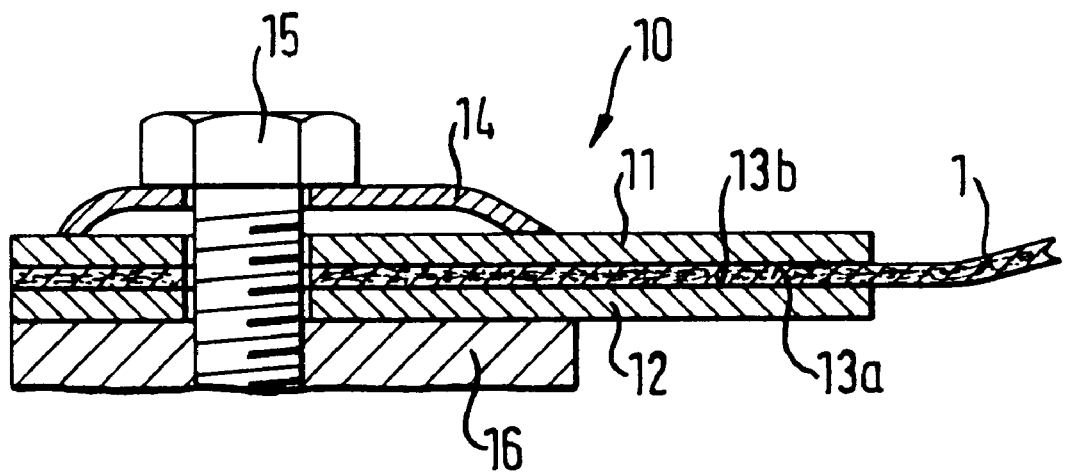
FIG. 5 is a section view of the anchorage fitting in a third embodiment of the invention.

The section view in FIG. 5 shows a third embodiment of the invention comprising an anchorage fitting 10 having an upper strip of sheet metal 11 and a lower strip of sheet metal 12 which receive the belt webbing 1 between them. The anchorage fitting 10 is fastened to a vehicle body 16 by a bolt fastener 15. A spring washer is supported on one side by the bolt fastener 15 and on the other side by the upper strip of sheet metal 11, as a result of which the pretension produced by the bolt fastener 15 is transmitted via the spring washer 14 to the upper strip of sheet metal 11, thus pretensioning the clamping surfaces areas 13a, 13b against the belt webbing 1. Consequently the belt webbing 1 is clamped between the clamping surface area 13a of the upper strip of sheet metal 11 and the clamping surface area 13b of the lower strip of sheet metal 12, thereby preventing the belt webbing from being pulled out of place. The elongated spring washer 14 extends from the bolt fastener 15 in the direction of the free end of the belt webbing 1, the spring washer 14 being configured so that an even distribution of the clamping force over the belt webbing 1 is achieved.

Figure 6:
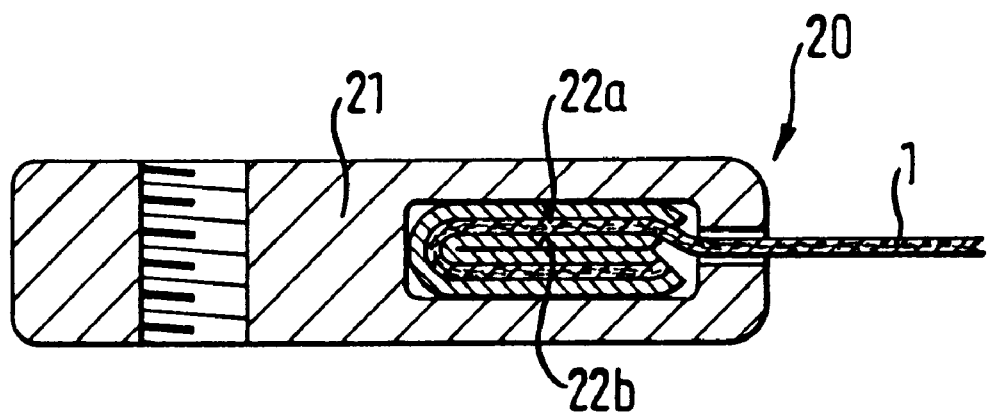
FIG. 6 is a section view of the anchorage fitting in a fourth embodiment of the invention.

In the section view of an anchorage fitting in a fourth embodiment of the vehicular seat belt in accordance with the invention as shown in FIG. 6 the belt webbing 1 is retained in the anchorage fitting 20. This anchorage fitting 20 consists of a flattened tube having clamping surfaces areas 22a, 22b creased once through 180° in the transverse direction of the belt webbing and which receive between them the belt webbing 1. The anchorage fitting 20 is clip-clasped by a clip fastener 21 comprising a slot through which the belt webbing 1 passes. Provided in the clip fastener 21 is a bolting hole into which a bolt fastener can be introduced for fastening to a vehicle body. In a loading situation the tensile force acting on the belt webbing 1 is translated firstly to the anchorage fitting 20 and then to the clip fastener 21. By configuring the contact surface areas correspondingly large a high localized material stress between the anchorage fitting 20 and the clip fastener 21 is avoided.

Figure 7:
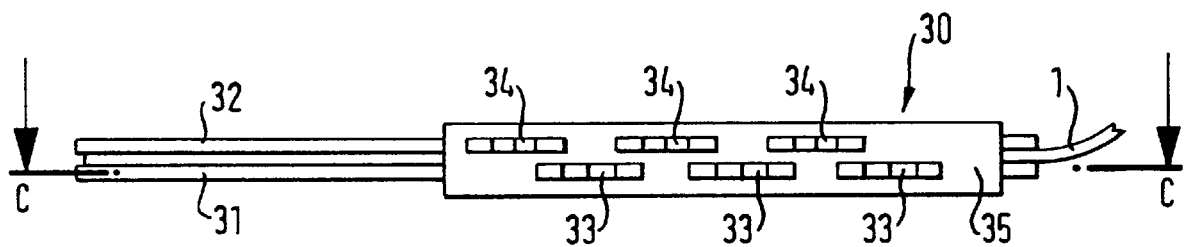
FIG. 7 is a side view of the anchorage fitting in a fifth embodiment of the invention.
Figure 8:
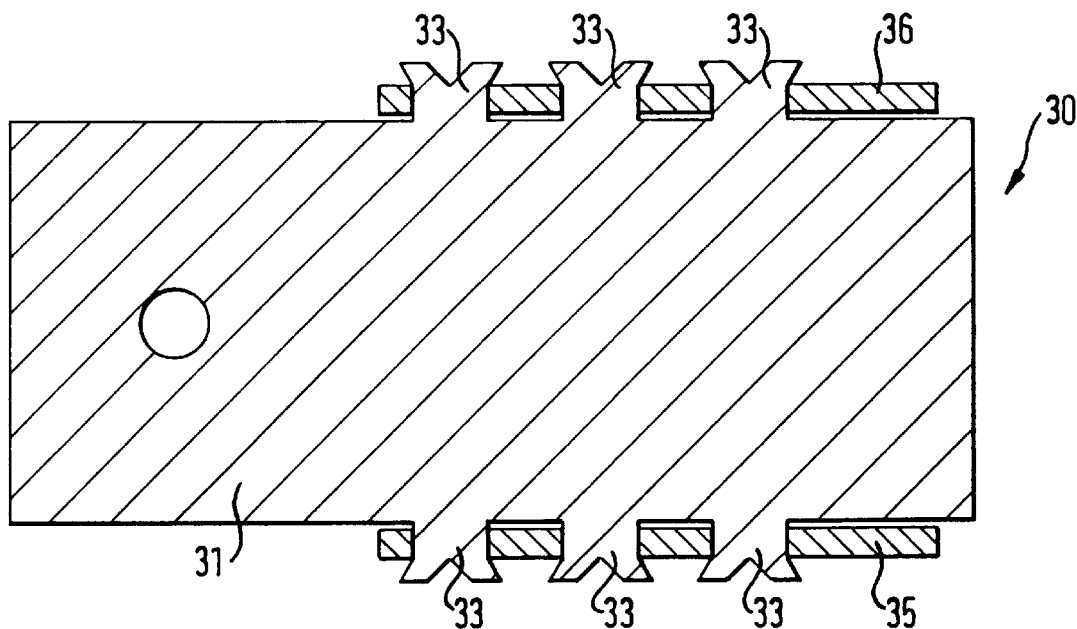
FIG. 8 is a section view of the anchorage fitting shown in FIG. 7 along the line C—C.

FIGS. 7 and 8 show an anchorage fitting 30 in a fifth example embodiment of the invention. In this case the belt webbing 1 is located between two strips of sheet metal 31, 32. These strips of sheet metal 31, 32 are provided with side retaining noses 33, 34. Serving to connect the two strips of sheet metal 31, 32 are side carrier parts 35, 36 comprising openings for insertion of the retaining noses, these openings being arranged on the carrier parts 35, 36 so that following complete introduction of the retaining noses 33, 34 in the openings a desired clamping force is generated on the belt webbing 1. The strips of sheet metal 31, 32 consist of simple sheet-metal parts, and no creasing or bending actions are necessary for mounting the anchorage fitting 30. To lock the side carrier parts 35, 36 in place in the fitted condition the retaining noses 33, 34 are caulked against the carrier parts 35, 36. For this purpose the retaining noses, as is evident from FIG. 8, are shaped so that their side end sections, each of which protrudes beyond the carrier parts 35, 36, are forced outwards, thus fixedly clamping the retaining noses 33, 34 in place in the carrier parts 35, 36.

Figure 9:
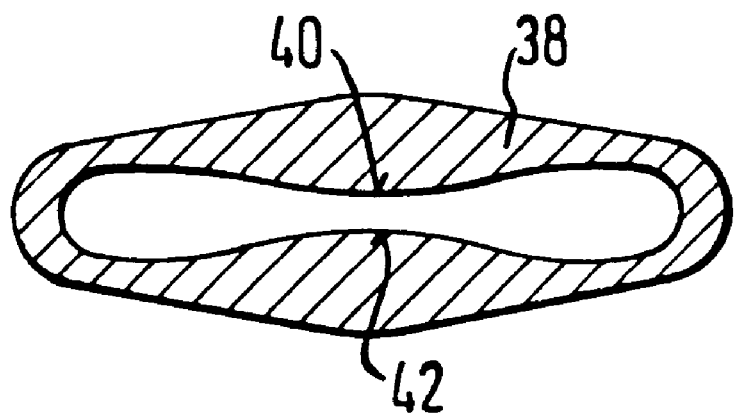
FIG. 9 is a section view of an anchorage fitting in a sixth embodiment of the invention.

FIG. 9 shows a section view of an anchorage fitting 38 in a sixth embodiment. The anchorage fitting 38 comprises a slot into which the belt webbing is inserted prior to crimping the anchorage fitting 38. The wall thickness of the anchorage fitting 38 increases from the outer edges of the belt webbing towards the middle of the latter, the clamping surfaces areas 40 and 42 also being configured convex transversely to the longitudinal direction of the belt webbing. Accordingly, when the anchorage fitting 38 is pressed together, first the middle portions of the anchorage fitting 38 come into contact with the belt webbing, followed by the side sections of the anchorage fitting 38 being pressed together and thereby being plastically distorted so that they rebound only unsubstantially. The belt webbing is now clamped in place over its full width. Any bending out of shape of the anchorage fitting 38 during pressing is reduced by the wall thickness increasing towards the middle of the belt webbing. The convex configuration of the clamping surfaces areas 40, 42 compensates the remaining bending of the anchorage fitting 38 so that a high clamping force is attained also in the middle of the belt webbing.

Figure 10:
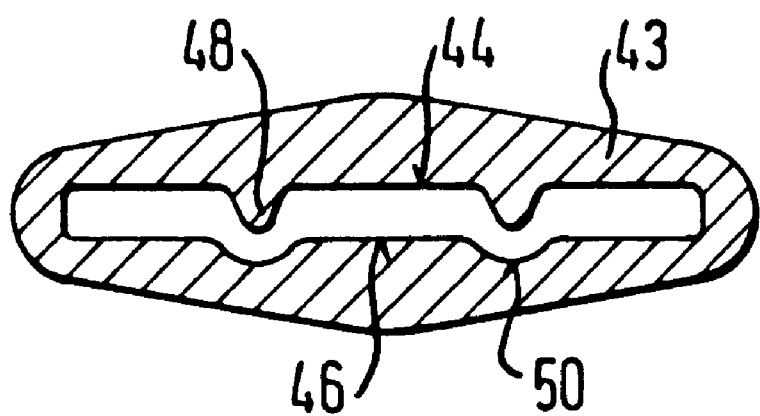
FIG. 10 is a side view of an anchorage fitting in a seventh embodiment of the invention.

FIG. 10 shows a section view of an anchorage fitting 43 in a seventh example embodiment. The clamping surfaces areas 44, 46 of this anchorage fitting 43 feature depressions 50 along with complementary protuberances 48 oriented in the longitudinal direction of the belt webbing. These prevent any shift in position of the belt webbing within the anchorage fitting 43 after crimping.

Figure 11:
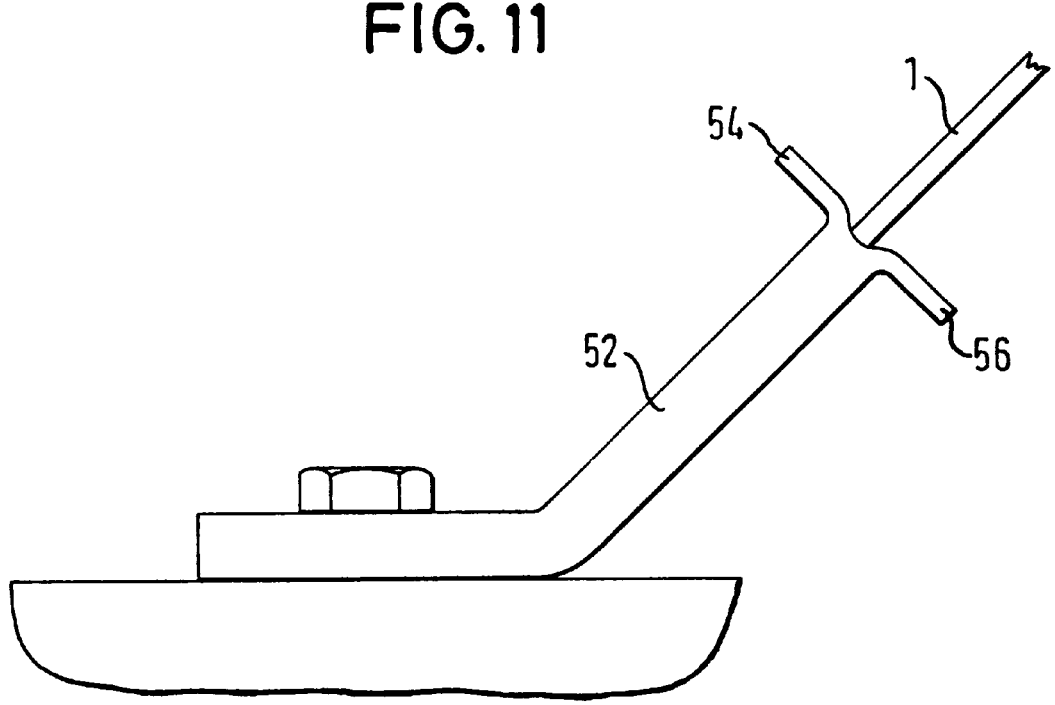
FIG. 11 is a side view of the anchorage fitting in a eighth embodiment of the invention.

Shown in FIG. 11 is an eighth embodiment of an anchorage fitting 52 in accordance with the invention. In this case the belt webbing 1 is received by the flattened tubular anchorage fitting 52. The end sections 54, 56 of the anchorage fitting 52 are bent outwards perpendicularly away from the belt webbing. The creased end sections 54, 56 stiffen the anchorage fitting 52 so that a consistent distribution of the clamping force is achieved over the width of the belt webbing 1.

Figure 12:
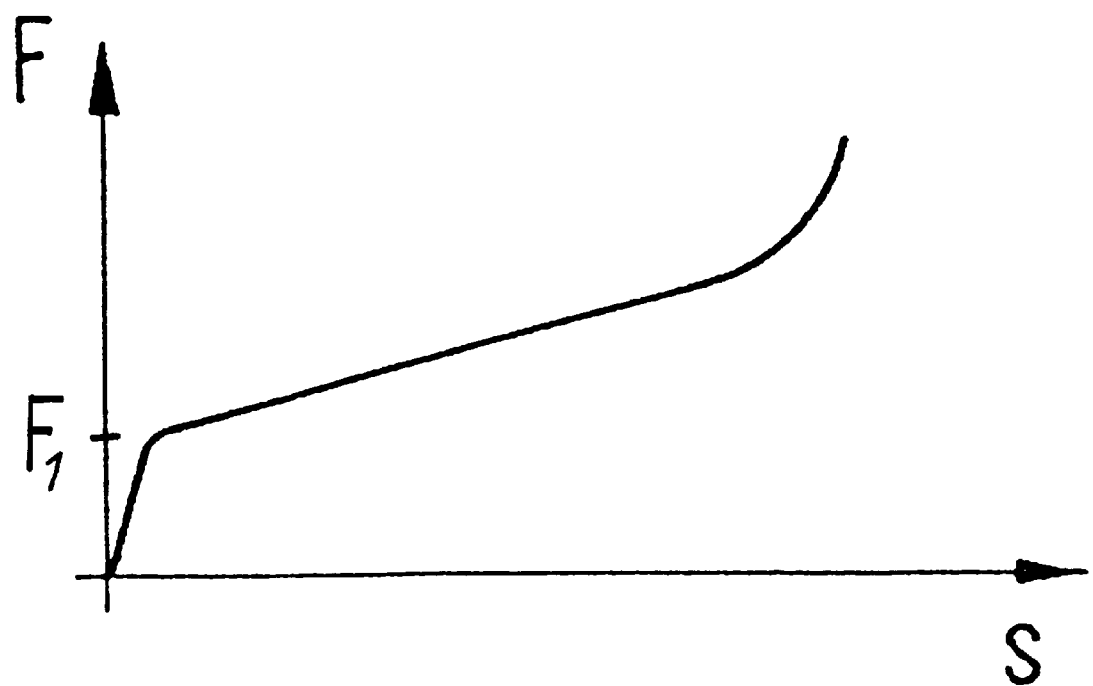
FIG. 12 is a diagram showing the characteristic curve of the force occurring in the belt webbing versus deformation displacement of the anchorage fitting shown in FIG. 1 to 3.

FIG. 12 shows a characteristic curve of the force F occurring in the belt webbing versus the deformation displacement S, said characteristic curve being a result of loading the anchorage fitting 2 shown in FIG. 1 to 3 in the longitudinal direction of the belt webbing. In case of a force F acting on the anchorage fitting 2 in the longitudinal direction of the belt webbing, to the right in FIG. 2, the force F occurring in the belt webbing increases steeply up to a threshold value $F_1$. If the force F occurring in the belt webbing exceeds the threshold value $F_1$, the anchorage fitting is deformed by stretching its corrugated parts. First, parts with a great corrugation height are deformed, whereas the deformation of parts having a smaller corrugation height requires a greater force F occurring in the belt webbing. Consequently, after having reached the threshold value $F_1$, which lies within a range between 2500N and 6000N, the characteristic curve of the force F occurring in the belt webbing versus the deformation displacement S of the anchorage fitting shows a flat and controlled increase. Load peaks in the belt webbing can thereby be prevented. Only after all corrugated parts have been stretched, the characteristic curve of the force F occurring in the belt webbing again shows a strong rise.

We claim:

1. A vehicular seat belt, comprising:
    an anchorage fitting with two clamping surface areas opposing each other and a belt webbing being fastened to said anchorage fitting, said seat belt webbing being clamped between said two clamping surface areas, said anchorage fitting having a creased strip of sheet metal with side sections having longitudinal edges, said side sections of said strip of sheet metal being creased longitudinally, and said longitudinal edges of said side sections facing each other having a complementary corrugated abutment edge.

2. A vehicular seat belt, comprising:
    an anchorage fitting with two clamping surface areas opposing each other and a belt webbing being fastened to said anchorage fitting, said seat belt webbing being clamped between said two clamping surface areas, said clamping surface areas being shaped corrugated complementary to each other, a corrugation height increases towards an anchoring to a vehicle body in a longitudinal direction of said belt webbing.

3. A vehicular seat belt, comprising:

an anchorage fitting with two clamping surface areas opposing each other and a belt webbing being fastened to said anchorage fitting, said seat belt webbing being clamped between said two clamping surface areas, said clamping surface areas being formed by hemispherical impressions and complementary protuberances.

4. A vehicular seat belt, comprising:

an anchorage fitting with two clamping surface areas opposing each other and a belt webbing being fastened to said anchorage fitting, said seat belt webbing being clamped between said two clamping surface areas, said clamping surface areas being provided with grooves oriented transversely to a longitudinal direction of said belt webbing.

5. A vehicular seat belt, comprising:

an anchorage fitting with two clamping surface areas opposing each other and a belt webbing being fastened to said anchorage fitting, said seat belt webbing being clamped between said two clamping surface areas, said clamping surface areas being connected to each other by rivets.

6. A vehicular seat belt comprising an anchorage fitting with a pair of opposed clamping members, each clamping member having an elongated clamping surface area, and a belt having a length of belt webbing being retained between said two clamping surface areas by said clamping members being pressed against said webbing throughout said length of belt webbing.

7. The vehicular seat belt as set forth in claim 6, wherein said anchorage fitting is configured as a tubular component being pressed to a flat shape.

8. The vehicular seat belt as set forth in claim 6, wherein said anchorage fitting has two sandwiched strips of sheet metal having side retaining noses on longitudinal edges, and side carrier parts arranged along said longitudinal edges of said strips of sheet metal, said retaining noses being caulked in said carrier parts.

9. The vehicular seat belt as set forth in claim 6, wherein said clamping surface areas are shaped corrugated complementary to each other.

10. The vehicular seat belt as set forth in claim 9, wherein said anchorage fitting is configured with at least one corrugated part and said anchorage fitting is deformable by a force acting in a longitudinal direction of said belt webbing, which is determined by a predetermined belt force limit diagramm, by stretching said at least one corrugated part.

11. The vehicular seat belt as set forth in claim 10, wherein said determined force amounts to between 2500N and 6000N.

12. The vehicular seat belt as set forth claim 6, wherein said clamping surface areas are provided with a rubber surface finish.

13. The vehicular seat belt as set forth in claim 6, wherein said clamping surface areas are connected to each other by a bolt fastener provided with a spring washer.

14. The vehicular seat belt as set forth in claim 6, wherein said clamping surface areas are creased in a transverse direction of said belt webbing.

15. The vehicular seat belt as set forth in claim 6, wherein a wall thickness of said anchorage fitting increases transversely to a longitudinal direction of said belt webbing from the outer edges to the middle of said belt webbing.

16. The vehicular seat belt as set forth in claim 6, wherein said clamping surface areas are configured convex transversely to a longitudinal direction of said belt webbing.

17. The vehicular seat belt as set forth in claim 6, wherein said clamping surface areas comprise depressions and complementary protuberances oriented in a longitudinal direction of said belt webbing.

18. The vehicular seat belt as set forth in claim 2, wherein end sections of said anchorage fitting are bent away from said belt webbing.

* * * * *